Dec. 20, 1949 W. F. SERIE 2,491,522
WORK HOLDER
Filed Dec. 10, 1945

INVENTOR.
WILLIAM F. SERIE.
BY
M. O. Hayes
ATTORNEY.

Patented Dec. 20, 1949

2,491,522

UNITED STATES PATENT OFFICE 2,491,522

WORK HOLDER

William F. Serie, New York, N. Y.

Application December 10, 1945, Serial No. 634,129

3 Claims. (Cl. 90—60)

(Granted under the act of March 3, 1883, as amended April 30, 1928; 370 O. G. 757)

This invention relates to a carrier for mounting rings on a vertical face plate.

An object of this invention is to provide a carrier for supporting and moving a heavy object horizontally and vertically to proper position for any work to be done on the object.

Another object of this invention is to provide a carrier for mounting heavy rings such as ring gear blanks of large diameter on the vertical face plate of a milling machine.

Figure 1:
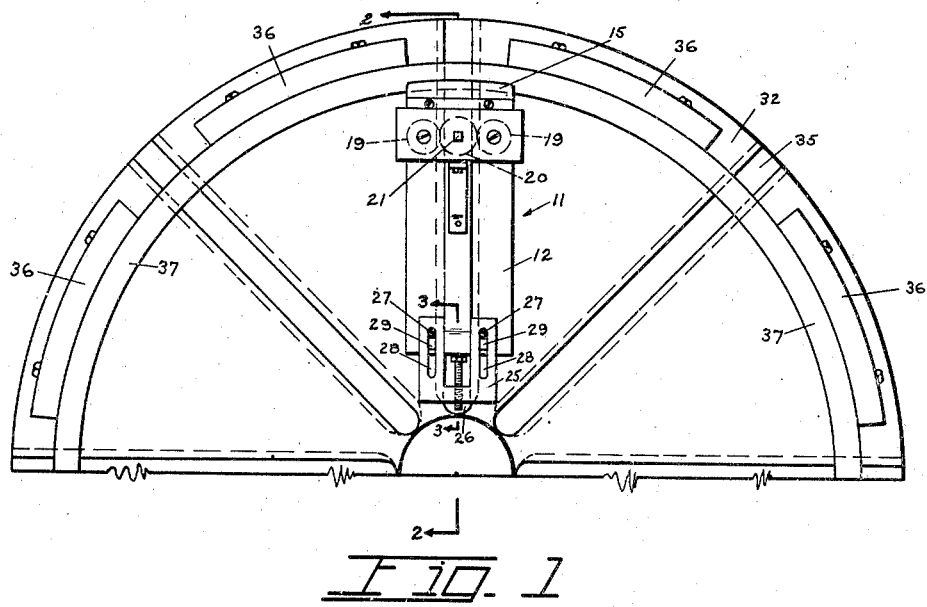
Figure 2:
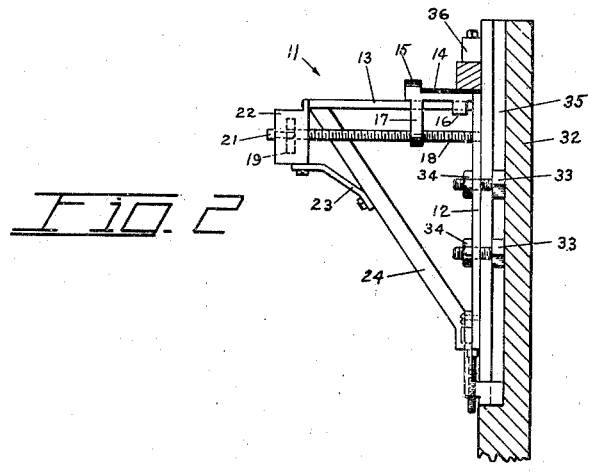
Figure 3:
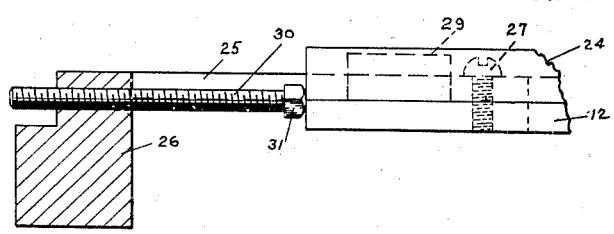

Further objects and advantages of this invention, as well as its construction, arrangement and operation, will be apparent from the following description and claims in connection with the accompanying drawing, in which Figure 1 is a front elevation of the upper half of a vertical face plate with a device embodying the present invention attached there, Figure 2 is a side elevation, partly in section on line 2—2 of Figure 1, and Figure 3 is a detail in cross-section, taken on line 3—3 of Figure 1.

The device of the invention comprises a carrier, designated generally at 11, that embodies a base plate 12 positioned radially of the face plate 32 of a machine tool in engagement with the face thereof. The device of the present invention is a fixture that is useful for handling heavy work pieces, to set them up to be machined on a heavy machine tool, and it is particularly useful for supporting heavy pieces in position for their attachment to the face plate of a machine tool of the horizontal type. The face plate 32 is therefor disposed vertically.

The guide 13 projects away from the upper portion of the base plate 12 horizontally. Slidably mounted on the horizontal guide 13 is a sliding platform 14 having a curved upper surface that engages the work piece 37 and on which it rests. A flange 15 at the forward end, that provides a stop to limit movement of the work piece 37 to the left in Figure 2 relative to the platform 14. Extending downwardly from the sliding platform are clips 16 engaging the edges of the horizontal guide 13 and arms 17 which are in threaded engagement with lead screws 18.

Each lead screw 18 has a spur gear 19 on its forward end which is rotated by a center spur gear 20. Spur gear 20 has a square extension 21 which may be rotated by means of a handle or a wrench. The gear box 22 encloses the three spur gears 19 and 20, is secured to the forward end of the horizontal guide 13, and is supported by the bar 23 which in turn is secured to the reenforcing rib 24. Reenforcing rib 24 extends from the forward end of the horizontal guide 13 to the lower portion of the base plate 12.

Sliding plate 25 is mounted on the base plate 12 by means of screws 27 which ride in slots 28 formed in the sliding plate. Guide lugs 29 formed on the base plate 12 also ride in slots 28 maintaining the sliding plate 25 in proper alignment. Adjusting screw 30 is in threaded engagement with the lug 26, and the head 31 thereof bears against the base plate 12. The lug 26 is positioned in the T-slot 35, and engages the end thereof nearest to center of the face plate 32. The carrier is mounted on the face plate 32 by means of bolts 33 and nuts 34 engaging the T-slots 35 of the face plate 32. The adjustable lug 26 serves to adjust the position of the carrier of the present invention radially of the face plate 32, and particularly serves to locate the curved work-engaging surface of the platform 14 in predetermined position radially.

The fixture of the present invention operates to locate the work piece 37 concentrically with the face plate 32 of the machine tool, the jig plates 36 being provided to hold the piece 37 attached to the face plate 32 during the machining operation. In the case of the heavy work piece 37, which for example may be a ring gear blank, the fixture of the present invention serves to support the blank 37 in position, the work-engaging platform 14 being traversed by lead screws 18 to position the blank 37 against the face of the face plate 32. The fixture enables the piece 37 to be adjustably positioned concentrically of the face plate 32, and to support the blank 37 concentrically positioned until its setup is completed by the jig plate 36 being attached.

In the operation of the device the carrier is mounted on the face plate 32 by means of bolts 33 and nuts 34 with the lug 26 engaging the end of the T-slot 35 nearest to the center of the face plate 32. The ring-gear blank is lowered onto the sliding platform 14 in its forward position. The sliding platform 14 is then moved backwardly by rotating the center spur gear 20 with a handle or wrench on the square extension 21. Rotation of the center spur gear 20 in turn rotates the spur gears 19 and lead screws 18, moving the sliding platform 14 towards the face plate 32.

Any vertical adjustment required to align the ring-gear blank with the jig plates 36 can be accomplished by means of the locating lug 26 and the adjusting screws 30. Since the lug 26 adapted to abut against one end of the T-slots, rotation of adjusting screw 30, using a wrench on head 31, will raise or lower the carrier, and locates the work-engaging surface of the platform 14 in predetermined position as desired radially of the face plate 32.

When a ring-gear blank 37 has been properly positioned and is firmly gripped by the jig plates 36, the carrier can be removed from the face plate 32 for the machining operation. The carrier can be used in a similar manner to remove the ring-gear blank when machining has been completed. This carrier can obviously be used for positioning various types of heavy work on many different types of machines with minor modifications.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A carrier comprising a vertical face plate having radially extending T-slots, a vertical base plate having means adapted to secure said base plate to the T-slots in said face plate, an adjustable plate slidably mounted on the lower portion of said base plate, a lug on the lower portion of said adjustable plate, said lug extending into said T-slot and bearing against the bottom of said T-slot, a bolt having a head bearing against said base plate and a shank threadedly engaging said lug, a horizontal guide extending outwardly from said base plate, a platform slidably mounted on said guide, arms having a threaded bore depending from said platform, lead screws engaging said threaded bore and gear means for rotating said lead screws.

2. A fixture for the face plate or the like of a machine tool comprising a carrier attachable to the face plate, a work-engaging member supported by the carrier, a lead screw operable to move the work-engaging member towards and away from the face plate to position the work into or out of engagement therewith, means holding the work-engaging member adjustably in position radially of the face plate, and locating means operable to predetermine the position of the carrier radially to predetermine the radial position of the work-engaging member.

3. A fixture for a vertically disposed face plate or the like of a machine tool comprising a carrier attachable to the face plate, a work-supporting member supported by the carrier, means comprising a lead screw operable to position the work piece on the supporting member towards or away from face plate to position the work piece into or out of engagement therewith, means holding the work-supporting member adjustably in position radially of the face plate to center the work piece therewith, and locating means operable to predetermine the position of the carrier radially to predetermine the radial position of the work-supporting member.

WILLIAM F. SERIE.

REFERENCES CITED

The following references are of record in the file of this patent:

UNITED STATES PATENTS

| Number | Name | Date |
| --- | --- | --- |
| 866,885 | Reiss et al. | Sept. 24, 1907 |
| 918,031 | Fisher | Apr. 13, 1909 |
| 1,329,849 | Pierson | Feb. 3, 1920 |
| 1,924,074 | O'Halloran | Aug. 22, 1933 |